3,157,588
ELECTROPHORETIC COATING APPARATUS
Edward D. Parent, Jr., Hamilton, Mass., assignor to Sylvania Electric Products Inc., a corporation of Delaware
Filed Dec. 14, 1960, Ser. No. 75,834
2 Claims. (Cl. 204—299)

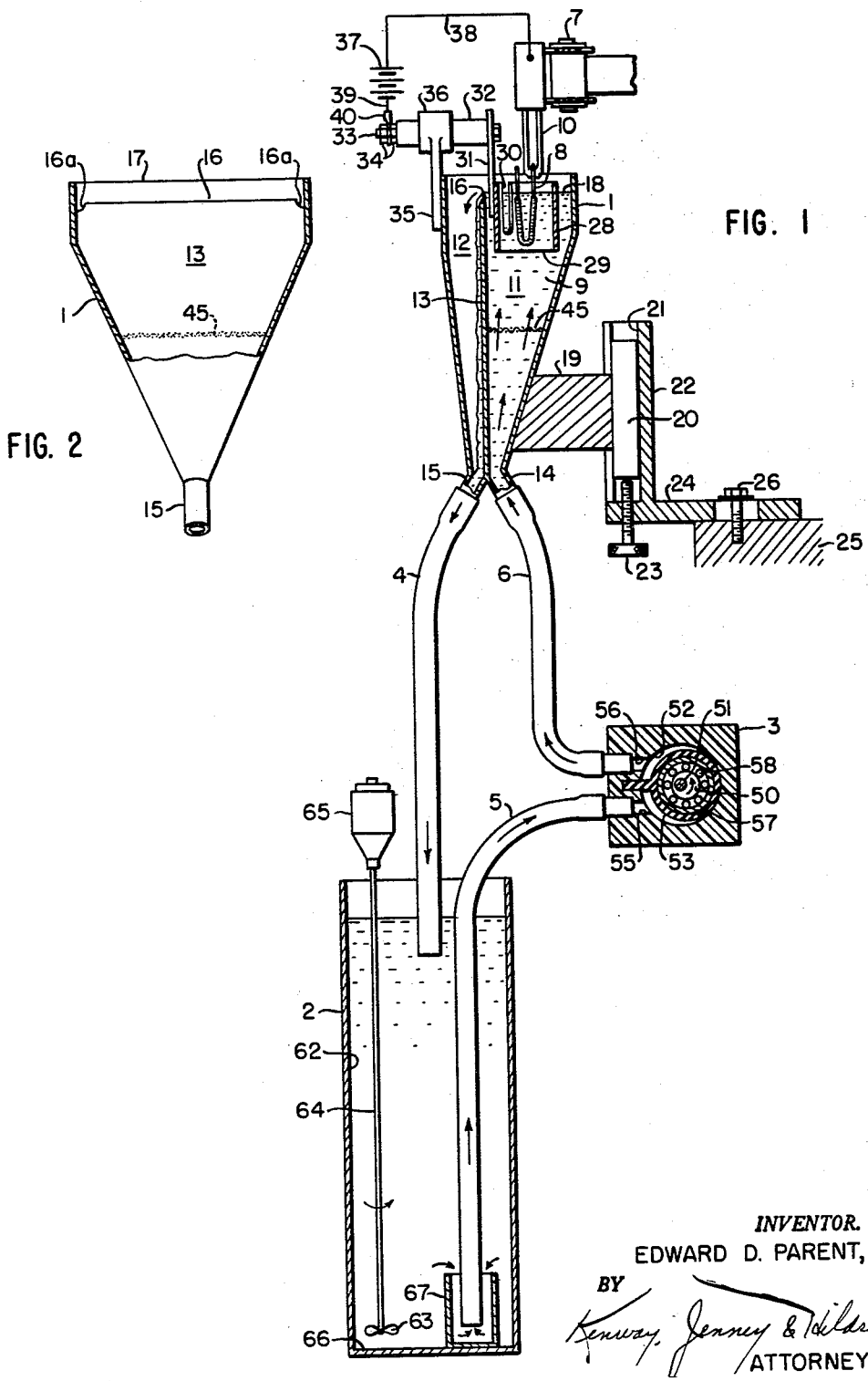

This invention relates to electrophoretic coating apparatus, and more particularly to apparatus for applying adherent coatings from a liquid suspension of finely divided particles by the electrophoretic process.

Electrophoretic coating has been utilized in a number of applications, including the formation of latex coatings in the rubber industry, the enameling of tin cans, and the coating of electrical filaments with insulating material. The process involves the sedimentation of fine particles from a suspension in an appropriate liquid medium. The suspension is preferably of a type characterized by stability in a diffuse state of the particles, but by increasing instability with increasing concentration of the particles.

An unstable suspension is one which exhibits relatively rapid settling of the suspended particles to the bottom of a container. In the absence of agitation, the suspension exhibits an increasing concentration gradient toward the bottom of the container, until the particles ultimately reach a fully settled condition.

The degree of cohesion of the settled layer depends upon the degree of attraction or repulsion of the particles. The establishment of a cohesive layer by settling of particles from a stable suspension is referred to herein as sedimentation. In order to form a sedimented layer having high particle attraction, it is necessary that the suspending medium be readily ionizable. The ionization of the liquid about a particle (known as an "ion cloud") appears to induce an ionization of opposite charge upon the surface of the particle, and thus forms a double electric layer. During the settling stage, when the particle spacing is relatively great and the concentration relatively low, the double layer produces a repulsion force such that the particles are non-cohesive. Upon further reduction of particle spacing by gravitational action, however, particle attraction is established, and a cohesive sediment forms. Cohesion of the lower portion of the sedimented layer is further increased by the weight of additional particles settling upon the upper surface of the layer. As settling proceeds, there remains an upper portion of the layer which is not fully sedimented or cohesive.

Electrophoretic coating involves the same phenomena as the settling process, but is induced by electrostatic attraction rather than by gravity. The article to be coated is extended into a suspension of the coating material in a suitable liquid, and an electric potential is applied through the liquid between the article and an electrode. Opposite polarity to that of the particles is applied to the article, and the particles migrate toward the article, establishing a sedimented layer thereon which is surrounded by a layer of settling particles which are relatively incohesive. Subsequent to coating, the article is rinsed in a suitable solvent to remove the settling layer, leaving the sedimented layer in an adherent coating upon the surface of the article.

Apparatus for carrying out electrophoretic coating is subject to conflicting requirements. The coating suspension must be maintained quiescent in the region of the coated article, to avoid interference with the settling of particles thereon. At the same time, however, it is necessary to continuously agitate the coating suspension to prevent gravity-induced sedimentation from clogging the apparatus, and to maintain a desired particle concentration for effective and uniform coating action. In addition to these conflicting requirements, the surface of the coating suspension must be maintained at a predetermined level to permit uniform and repetitive coating of desired portions of a series of like articles.

Previous efforts to satisfy these requirements have included the provision of containers with paddle agitators operated only during intervals between the coating of articles successively dipped into the suspension. Such apparatus has not proven entirely satisfactory, because of the continuation of turbulence after the cessation of agitation, and the deposition of sedimented solids on the horizontal surfaces of the coating container. An effort has been made to improve this apparatus by continuously pumping the coating suspension into an overflow container and thence back to the coating container, but this arrangement has not proven satisfactory in that the flow of the suspension through the coating container interferes with good coating action. Sedimentation in the circulating apparatus has also been found to be objectionable.

It is the primary object of my invention to provide an improved electrophoretic coating apparatus which is effective to maintain a more uniform concentration of coating particles in a coating suspension liquid and to prevent the formation of a sedimented layer of particles in the apparatus, and which at the same time provides a quiescent zone of uniform level for the uniform and effective coating of articles.

It is a further object of my invention to provide an improved electrophoretic coating apparatus, of the kind which continuously circulates a coating suspension, with improved means for reducing pulsations in the flow of the coating suspension and thereby affording a more nearly quiescent zone for the coating of articles.

It is still a further object of my invention to provide an electrophoretic coating apparatus with an improved coating container which affords a quiescent suspension surface at a uniform level.

Further objects and advantages of my invention will become apparent as the following description proceeds.

Briefly stated, in accordance with a preferred embodiment thereof, I may carry out my invention by providing a coating container for affording a quiescent coating suspension surface of controlled level for the electrophoretic coating of articles, a reservoir having means for continuously agitating coating suspension therein, and pumping means, and by connecting these elements for recirculation of the coating suspension between the container and the reservoir. The coating container is vertically elevated from the reservoir for gravity return of a flow of suspension from the coating container to the reservoir, and the pump is arranged to deliver a flow of suspension from the reservoir to the container. In a preferred embodiment of the invention, the reservoir is provided with agitating means positioned near a lower end thereof to prevent the accumulation of a sedimented layer upon the bottom of the reservoir.

To damp pulsations in the flow of suspension into the coating container from the pump, the container is arranged to receive the flow at a lower end thereof, from which the walls of the container diverge upwardly in the direction of flow. This divergence affords an increasing cross-sectional area which serves effectively to damp pulsations and turbulence in the flow of suspension and thus establishes a quiescent zone therein. At its upper end, the container is provided with a horizontal weir over which the liquid flows to maintain a quiescent surface of uniform level for the coating of articles in a controlled manner. Overflow means are provided for returning the flow by gravity from the weir to the reservoir. As a further feature, a screen is disposed intermediate the upper and lower ends of the reservoir to aid in damping pulsations in the flow of suspension. The screen serves the additional function of catching any objects or particles which are released into the container by the coating operation, thereby preventing their downward movement into the pump.

A suitable electrode is inserted into the surface of the coating suspension at the top of the coating container, and means are provided for dipping articles to be coated into the suspension at a distance from the electrode. Alternatively, the articles may be dipped by hand, although this is undesirable as a repetitive process, and does not provide a uniform result. Additionally, means are provided for applying an electric potential across the electrode and the article to be coated, for inducing electrophoretic coating action; these means are conventional, and in themselves form no part of the present invention.

While the specification concludes with claims particularly pointing out and distinctly claiming the subject matter which I regard as my invention, it is believed that the invention will be more clearly understood from the following detailed description of a preferred embodiment thereof, referring to the accompanying drawing, in which:

FIG. 1 is a sectional view in elevation of a coating apparatus according to a preferred embodiment of the invention; and FIG. 2 is a sectional end view of a coating container forming a portion of the apparatus.

Referring to the drawing, the improved coating apparatus comprises a closed recirculating system including a coating container 1, a reservoir 2, a pump 3, and conduits 4, 5, and 6 connecting the elements of the apparatus in serial fluid flow relation. In the embodiment illustrated, the coating apparatus is utilized in conjunction with a chain conveyor 7 of a conventional type arranged to dip a succession of filaments, one of which is shown at 8, into a supply of coating suspension liquid 9 for applying a coating of insulation to the filaments by electrophoresis. The conveyor carries a series of forceps 10 for gripping the filaments, and is arranged to dip the individual filaments successively into the coating suspension for timed intervals. The conveyor mechanism may be of any conventional type, and no further detailed description thereof is believed necessary.

The coating container 1 has the form of a rectangular-section funnel, whose walls diverge upwardly. The container is divided into a coating chamber 11 and an overflow chamber 12 by means of a transversely-extending partition 13. The partition 13 and the interior surfaces of the container 1 are provided with a fluorinated plastic coating to prevent the adherence of sedimented layers thereto. At the lower end of the container, an inlet tube 14 communicates with the coating chamber 11, and an outlet tube 15 communicates with the overflow chamber 12.

The partition 13 is formed with a sharp-edged horizontally-extending weir 16 vertically spaced below the upper end 17 of the container 1. An upwelling flow of coating suspension flows over the weir and downwardly through the overflow chamber 12 to the outlet 15. A surface 18 of the coating suspension is thus established at a uniform level, so that desired portions of the filaments may be uniformly coated. The edges of the weir adjoining the walls of the container are recessed at 16a to prevent stagnation of flow at these corners of the surface 18.

The coating container is mounted for vertical adjustment by means of an arm 19 having a slide 20 secured thereto and slidably received in a vertically-extending groove 21 of a mounting bracket 22. An adjusting screw 23 is threaded through a base portion 24 of the mounting bracket, and supports the slide 20 in a vertically adjusted position. The mounting bracket is secured to a supporting surface 25 by means of a bolt 26, or in any other suitable fashion. By these means, the container 1 may be vertically adjusted to position the surface 18 at a desired level for coating predetermined portions of filaments of varying forms and dimensions.

The coating material particles and the liquid suspension medium may be of various types, as is well known in the art. In the coating of metallic filaments with aluminum oxide, for example, the use of methanol as a suspension medium affords excellent results.

The electrophoretic coating process is carried out by suspending a cylindrical electrode 28 in the surface 18 of the coating suspension and by applying an electric potential between the filament 8 and the electrode. A flow of coating suspension about the filament takes place through an open lower end 29 of the electrode, and an outlet slot or slots 30 thereof. The electrode is secured to a hanger 31 which is supported in an insulator 32 by means of a bolt 33 and nuts 34 threaded thereon. A bracket 35 is soldered or otherwise suitably secured to the container 1, and receives the insulator 32 in an annular boss 36 thereof, to support the electrode assembly upon the container. An electric potential is supplied across the electrode and the filament by means of a battery or other source of direct current 37, one terminal of which is connected to the forceps 10 by means of a conductor 38, and the other terminal of which is connected to the electrode by means of a conductor 39 and a connector 40 clamped on the bolt 33 by means of the nuts 34. Insertion of the filament into the coating suspension results in a current flow which deposits a sedimentary coating of particles upon the filament. In the coating of filaments with aluminum oxide in a suspension of methanol and suitable ionizing activators, the filament serves as the anode and the electrode as the cathode, the polarity of the battery 37 being as illustrated in the drawing. The formation of an adherent and uniform coating requires that the coating suspension about the filament and in the vicinity of the surface be substantially quiescent. I have discovered that the provision of diverging walls in the container 1 to increase the cross-sectional area of the chamber 11 upwardly has a highly beneficial effect in damping any pulsation in the flow of suspension from the pump 3. Additionally, I mount a screen 45 within the passage 11 and extending transversely thereto to further damp pulsations in the flow. The screen is preferably of fine mesh, affording sufficiently small openings to prevent the passage therethrough of foreign matter or flocculated particles of coating material. The screen thus serves the dual function of aiding in damping pulsations in the flow, and of preventing the passage of sediments to the pump 3. By these means, a quiescent zone is established in the suspension at the surface 18.

While the construction of the pump 3 is not critical to the practice of the invention, it is desirable to utilize a pump of the positive displacement type, which is at the same time not subject to clogging by the accumulation of coagulated material or to wear by the highly abrasive coating particles. In the embodiment shown, a valveless eccentric pump is provided, comprising a rotor 50 eccentrically mounted upon a suitably driven shaft 51 within a cylindrical chamber 52. A flexible gland 53 is received in the chamber and forms a partition closing direct communication between an inlet opening 55 and an outlet opening 56, which are connected to the conduits 5 and 6, respectively. A sleeve 57 is received within the gland and is mounted upon the rotor 50 by means of ball bearings 58. Rotation of the rotor in the direction shown by the arrow affords a pumping action of a pulsating nature from the inlet 55 to the outlet 56, and thus establishes a flow of suspension from the reservoir to the coating container 1. Other well-known types of pumps may alternatively be utilized; for example, a pump of the type having fingers which successively squeeze a tube in the direction of flow has been found to be effective. However, an eccentric pump is preferred because it is less subject to rapid destruction by the abrasive coating particles of the suspension. The body of the pump and the gland 53 should be formed of flexible materials which will withstand swelling or chemical attack by the coating ingredients.

An agitating impeller 63 is mounted upon the elongated shaft 64 of a motor 65, and extends in close proximity to the bottom surface 66 of the reservoir to maintain a uniform concentration of particles of coating material in the suspension medium. This location of the impeller prevents the formation of a sedimented layer of particles of coating material settling from the suspension medium. I have found that a rotational speed of about 1000 r.p.m. of an impeller approximately 1½ inches in diameter is effective to maintain a uniform concentration in a reservoir of six quart capacity. In order to prevent the induction of air bubbles in the conduit 5, the conduit is extended into a cylindrical cup 67 secured to the bottom of the reservoir, and flow occurs in the directions shown by the arrows. Additional particles of coating material may be added to the reservoir from time to time to maintain a desired concentration.

The overflow of suspension from the coating container continually flows through the conduit 4 into the reservoir, so that a closed recirculating system is provided in which the reservoir constitutes an agitated zone for maintaining a uniform concentration of coating material in the suspension. The coating chamber 11 constitutes a quiescent zone in which a uniform surface level is maintained by the weir 16, and in which pulsations induced by the pump are effectively damped by the divergence of the container walls and by the screen 45. The apparatus thus effectively accommodates the conflicting requirements of uniform concentration and quiescence which are necessary for the formation of uniform and adherent electrophoretic coatings.

While I have shown and described preferred embodiments of my improved apparatus by way of illustration, various changes and modifications will occur to those skilled in the art without departing from the true spirit and scope of the invention. I therefore intend to cover all such changes and modifications in the appended claims.

What I desire to claim and secure by Letters Patent of the United States is:

1. In an electrophoretic coating apparatus, the combination comprising: an open-topped container for a coating suspension, said container adapted to receive articles of work for electrophoretic coating, said container being formed with upwardly diverging walls; a partition dividing said container into a coating chamber and an overflow chamber, said coating chamber having an inlet and said overflow chamber having an outlet, the upper edge of said partition forming a horizontally extending weir adjacent the top thereof for overflow of suspension from said coating chamber into said overflow chamber for maintenance of a suspension surface of a predetermined level in said coating chamber, the horizontal cross sectional area of said coating chamber increasing continuously from the bottom thereof towards the top for the major portion of its length, means for suspending an article to be electrophoretically coated below the top of the suspension surface of said coating chamber; means for imposing an electric potential upon said suspension between said article and an electrode; means for applying to said article an electric potential which is opposite to that of said suspension, whereby particles in said suspension will migrate toward said article and coat thereupon; a reservoir disposed in cyclic flow relation with said container; first conduit means connecting said reservoir to the inlet of said coating chamber; second conduit means connecting the outlet of said overflow chamber to said reservoir; pump means disposed in said first conduit between said reservoir and the inlet to said coating chamber, whereby coating suspension will be pumped from said reservoir into said coating chamber through said first conduit and will flow over said weir into said overflow chamber into said second conduit means and back into said reservoir, means to agitate said suspension in said reservoir.

2. The apparatus according to claim 1 wherein a screen is disposed in said container, intermediate said inlet and the upper surface of said weir for further dampening of pulsations in the flow of suspension.

References Cited by the Examiner
UNITED STATES PATENTS

| | | | |
|---|---|---|---|
| 2,073,952 | 3/37 | Shepherd | 204—186 |
| 2,355,564 | 8/44 | Sebald | 210—20 |
| 2,620,298 | 12/52 | Fischer | 204—299 |
| 2,800,447 | 7/57 | Graham | 204—299 |
| 2,851,408 | 9/58 | Gerulli | 204—299 |
| 2,980,731 | 4/61 | Alheritiere et al. | 210—20 |

FOREIGN PATENTS 562,310    5/58    Belgium.

JOHN H. MACK, Primary Examiner.

JOHN R. SPECK, MURRAY TILLMAN, Examiners.